United States Patent
Botsolas

[11] 3,908,705
[45] Sept. 30, 1975

[54] INSULATING COVER WITH OPEN PYRAMIDAL PASSAGEWAY PROJECTIONS

[75] Inventor: Chris J. Botsolas, Perth Amboy, N.J.

[73] Assignee: Johns-Manville Corporation, Denver, Colo.

[22] Filed: Oct. 19, 1973

[21] Appl. No.: 407,868

Related U.S. Application Data

[63] Continuation of Ser. No. 56,820, July 21, 1970.

[52] U.S. Cl. .............. 138/149; 138/100; 138/102; 138/157
[51] Int. Cl. .................. F16l 9/14; F16l 9/22
[58] Field of Search............ 138/148, 149, DIG. 9, 138/DIG. 11, 100–102, 115, 157; 174/97, 174/101; 52/731

[56] References Cited
UNITED STATES PATENTS

| | | | |
|---|---|---|---|
| 1,450,935 | 4/1923 | Anderson.................. | 138/102 X |
| 1,572,887 | 2/1926 | Dale............................ | 138/100 X |
| 3,095,014 | 6/1963 | Dosker....................... | 138/149 X |
| 3,557,840 | 1/1971 | Maybee...................... | 138/149 |

FOREIGN PATENTS OR APPLICATIONS

| | | | |
|---|---|---|---|
| 2,672 | 1802 | United Kingdom........ | 138/157 |
| 1,326,654 | 4/1963 | France....................... | 138/149 |

Primary Examiner—Henry K. Artis
Assistant Examiner—James E. Bryant, III
Attorney, Agent, or Firm—Robert M. Krone; James W. McClain

[57] ABSTRACT

Insulation blocks or the like covering a surface to be insulated have a multiplicity of discrete projections extending outwardly from one surface thereof which are adapted to contact the surface being insulated, thereby defining a network of interconnected air passageways between the insulation and the insulated surface.

2 Claims, 2 Drawing Figures

U.S. Patent  Sept. 30,1975  3,908,705

INVENTOR.
CHRIS J. BOTSOLAS
BY
Morgan, Finnegan, Durham & Pine
ATTORNEYS 3,908,705

INSULATING COVER WITH OPEN PYRAMIDAL PASSAGEWAY PROJECTIONS

This is a continuation of application Ser. No. 56,820, filed July 21, 1970.

BACKGROUND OF THE INVENTION

1. Field of the Invention

The present invention relates generally to thermal insulation coverings of utility especially in insulating equipment, such as the ductwork between a boiler and the chimney thereof, where an air space is desired between the surface of the equipment and the insulation, and relatles more particularly to certain new and useful improvements in such insulation coverings for providing interconnecting air passageways between the insulation and the surface being insulated 2. Description of the Prior Art In thermally insulated enclosures, it is often desirable to provide an air space between the insulated surface and the insulation material itself. One result of providing such an air space is to increase the effective thermal insulation between the insulated surface and the surroundings.

Also, in situations where the insulated surface is subjected to cyclical heating and cooling and it is desired to allow the insulated surface to heat rapidly, the provision of an air space between the insulated surface and the insulation is desirable. Without such an air space, the insulated surface heats up more slowly since the insulation material, which is in direct contact with the surface, must first be heated. As an example of the foregoing, in breeching ductwork extending between a boiler and its associated chimney, it is the practice to provide an air space between the metallic breeching and the insulation material to allow the metallic breeching to heat rapidly in order to prevent condensation of the combustion fumes into corrosive hydrochloric acid.

Heretofore, it has been the customary practice to obtain the aforementioned air space by initially installing a metallic air space wire over the equipment to be insulated and thereafter applying the insulation material over the air space wire. The metallic air space wire acts to separate the equipment surface from the insulation material, thereby providing a trapped or dead air space therebetween. However, this procedure is highly disadvantageous in that it entails substantial expense and is very time consuming as it requires the application of two separate materials to the insulated surface. Further, the air space wire often does not easily conform to the configuration of the surface being insulated and thus often does not adequately support the insulation material applied thereto, resulting in cracks and consequent additional expense.

OBJECTS OF THE INVENTION

It is therefore an object of this invention to provide, as an article of manufacture, a novel and improved insulation covering.

Another object of this invention is to provide a novel and improved insulation covering which provides an air space between the insulated surface and the insulation without the requirement for any intermediate spacer device.

Another object of this invention is to provide a novel and improved insulation covering which provides an air space between the insulated surface and the insulation which may be easily and inexpensively installed.

Another object of this invention is to provide a new and improved method for insulating a surface with an air space between the insulation material and the insulated surface.

Another object of this invention is to provide a new and improved method for insulating a surface with an air space between the insulation material and the insulated surface which eliminates the disadvantages and shortcomings of the prior customary practices.

Objects and advantages of the invention are set forth in part herein and in part will be obvious herefrom, or may be learned by practice with the invention, the same being realized and attained by means of the instrumentalities and combinations pointed out in the appended claims.

The invention consists in the novel parts, constructions, arrangements, combinations, improvements, steps and processes herein shown and described.

SUMMARY OF THE INVENTION

Briefly described, the thermal insulation covering of the present invention comprises insulation material, preferably in the form of one or more blocks adapted to cover a surface to be insulated, having a multiplicity of discrete projections extending outwardly from one surface thereof, which are adapted to contact the surface being insulated to define a network of interconnected air passageways between the insulation material and the insulated surface.

The method of the present invention for insulating a surface with an air space between the surface and the insulation comprises forming insulation material with a multiplicity of discrete projections extending outwardly from one surface thereof and thereafter applying the insulation material directly to the surface to be insulated, whereby the projections define a network of interconnected air passageways between the insulation and the surface being insulated.

It will be apparent from the foregoing general description that the objects of the invention specifically enumerated herein are accomplished by the invention as herein embodied.

Thus, insulation material may be easily and quickly formed with a multiplicity of projections extending outwardly from one surface thereof, whether by pressing, forming or machining the projections integrally therewith or by mechanically affixing the projections thereto, and the subsequent application of such an insulation material to a surface being insulated provides an air space between the insulated surface and the insulation itself which completely eliminates the need for a separate spacer device, as well as the entire labor operation of installing such a spacer, both of which are presently required with customary practices.

It will be understood that the foregoing general description and the following detailed description as well are exemplary and explanatory of the invention but are not restrictive thereof.

The accompanying drawings, referred to herein and constituting a part hereof, illustrated preferred embodiments of the invention, and together with the description, serve to explain the principles of the invention.

DESCRIPTION OF THE PREFERRED EMBODIMENTS

Figure 1:
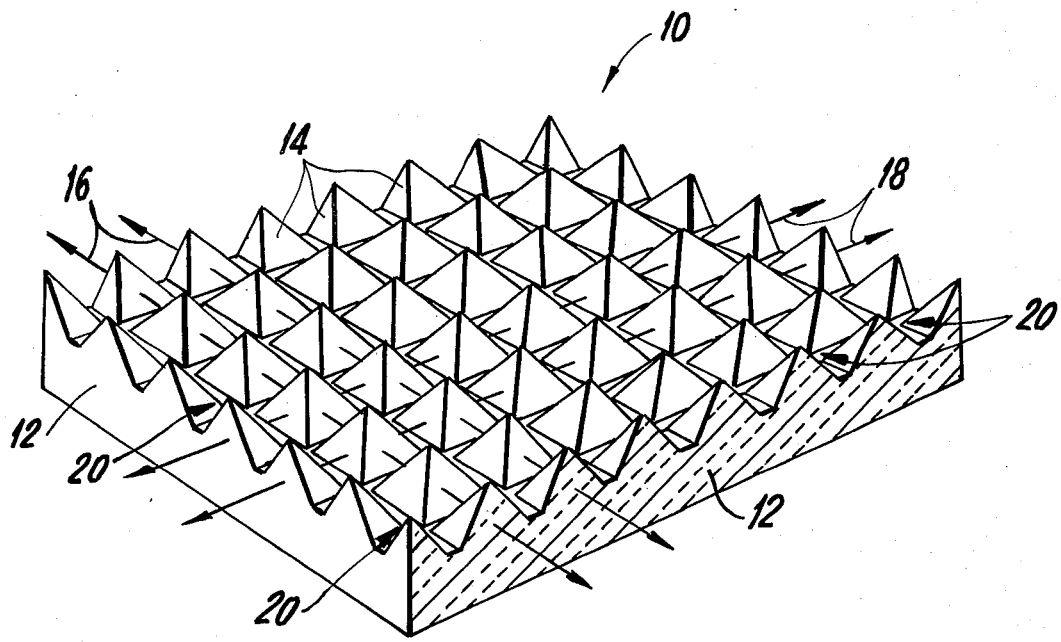
FIG. 1 is a fragmentary perspective view, partly in section, of a block of insulation material having a multiplicity of discrete projections extending outwardly from one surface thereof, in accordance with the present invention.

Referring now more particularly to the preferred embodiment of the article of manufacture of the invention shown in FIG. 1 of the accompanying drawing, there is illustrated an insulation block, indicated generally by reference numeral 10, comprising a solid portion 12 and a multiplicity of discrete projections 14 formed integrally with solid portion 12 and extending outwardly therefrom.

Advantageously, and as here preferably embodied, projections 14 are in the form of small pyramidal structures, arranged in uniform rows 16 and columns 18 so as to provide a network of interconnected passageways 20 therebetween.

It will be understood, however, that the present invention is not limited to the particular shape, number or pattern of distribution of projections 14 and that other shapes and arrangements functionally equivalent to the shape and arrangement of projections 14 may be used with equally satisfactory results. Thus, projections 14 may have conical or cylindrical shapes, and may be distributed in any arrangement and number, as long as a network of interconnected passageways are provided therebetween and there is adequate support for the solid portion 12 of the insulation block 10 when installed against a surface to be insulated, as more fully described hereinafter.

It will also be understood that insulation block 10 may be formed from any suitable insulation material, such as, for example, calcium silicate, fiber glass, asbestos fibrous material, foam-glass, etc., and that it may be formed into any suitable configuration so as to conform to the shape of the surface being insulated, such as, for example, quarter- or semi-circles for round ducts.

As previously mentioned, projections 14 are advantageously formed integrally with block 10, such as by pressing, molding or machining, but may also be suitably mechanically affixed thereto, such as by glueing.

Figure 2:
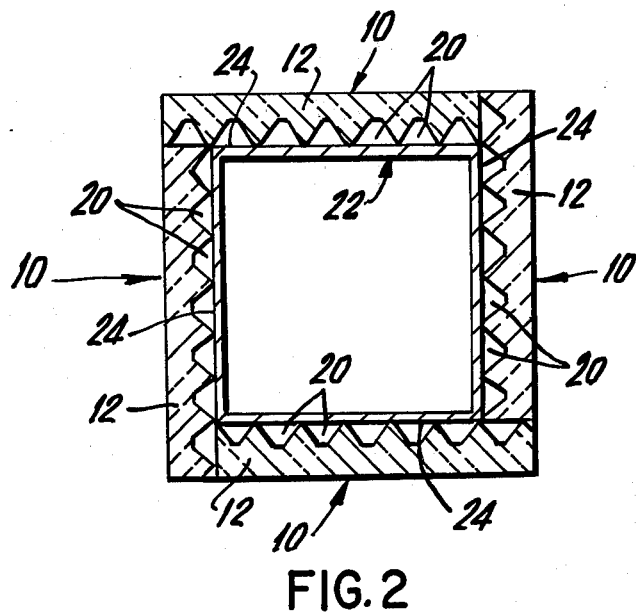
FIG. 2 is a cross sectional view of a duct member having an insulating covering applied thereto according to the method of the present invention.

Referring now more particularly to FIG. 2 of the accompanying drawing, there is illustrated a duct member, indicated generally by reference numeral 22, having its surfaces 24 covered with insulation in accordance with the method of the present invention.

Thus, there is provided a plurality of insulation blocks 10 formed of insulation material having a multiplicity of discrete projections 14 extending outwardly from the solid portion 12 thereof. The insulation blocks 10 are applied to duct 22 so that the projections 14 directly contact the surfaces 24 of duct 22, whereby the projections 14 define a network of interconnected air passageways 20 between the surfaces 24 being insulated and the solid insulation portion 12 when the insulation blocks 10 are installed.

The invention in its broader aspects is not limited to the specific embodiments herein shown and described but departures may be made therefrom without departing from the principles of the invention and without sacrificing its chief advantages.

What is claimed is:

1. An insulated duct comprising: a rectangular duct, four flat insulating blocks covering an entire outer surface of said duct, a multiplicity of discrete pyramidal projections extending from a side of each block, which abuts the duct in a uniform pattern of columns and rows; said pyramidal projections defining a network of interconnected open passageways through which upon contact with said duct a network of air passageways is formed between an insulated duct and said insulating block.

2. A method for applying insulation to a rectangular duct comprising: applying flat insulation blocks to said duct, said insulation blocks being composes of discrete pyramidal projections on one entire side thereof, said pyramidal projections defining a network of interconnecting open passageways; contacting said pyramidal projections to said rectangular duct in such a way to maintain the rigidity of said pyramidal projections and thereby maintaining the open passageways between said pyramidal projections to form an air space between the insulating material and the rectangular duct.

* * * * *